United States Patent [19]

Cooper et al.

[11] Patent Number: 5,775,916
[45] Date of Patent: Jul. 7, 1998

[54] METHOD OF MAKING A SURGICAL AND/OR CLINICAL APPARATUS

[75] Inventors: Carolyn M. Cooper, Briston; James Sunderland, London, both of England

[73] Assignee: Limbs & Things Limited, Bristol, England

[21] Appl. No.: 704,447

[22] Filed: Aug. 27, 1996

Related U.S. Application Data

[62] Division of Ser. No. 256,663, filed as PCT/GB93/00088, Jan. 15, 1993.

[30] Foreign Application Priority Data

Jan. 15, 1992 [GB] United Kingdom ............ 9200858
Aug. 13, 1992 [GB] United Kingdom ............ 9217157
Oct. 19, 1992 [GB] United Kingdom ............ 9221934

[51] Int. Cl.⁶ ........................................ G09B 23/30
[52] U.S. Cl. ................................ 434/267; 434/272
[58] Field of Search ........................ 434/267, 262, 434/82, 270, 272, 273

[56] References Cited

U.S. PATENT DOCUMENTS

| | | | |
|---|---|---|---|
| 4,134,218 | 1/1979 | Adams et al. | 35/17 |
| 4,481,001 | 11/1984 | Graham et al. | 434/267 |
| 4,767,333 | 8/1988 | Born | 434/262 |
| 4,789,340 | 12/1988 | Zikria | 434/272 |
| 4,867,686 | 9/1989 | Goldstein | 434/267 |
| 5,090,910 | 2/1992 | Narlo | 434/82 |
| 5,149,270 | 9/1992 | McKeown | 434/262 |
| 5,518,407 | 5/1996 | Greenfield et al. | 434/272 |

FOREIGN PATENT DOCUMENTS

WO93/134218  10/1993  Germany.

Primary Examiner—John S. Hilten
Attorney, Agent, or Firm—Marshall, O'Toole, Gerstein, Murray & Borun

[57] ABSTRACT

There are disclosed various forms of structure simulating body tissue for use in practicing surgical and/or clinical techniques. In one form, a composite pad comprises a pad (2) of elastomeric material bonded via a bonding layer (4) to a thin sheet of foam latex rubber simulating epidermis. A kit for use with such pads is also disclosed.

15 Claims, 6 Drawing Sheets

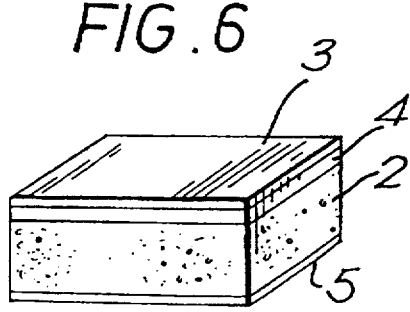
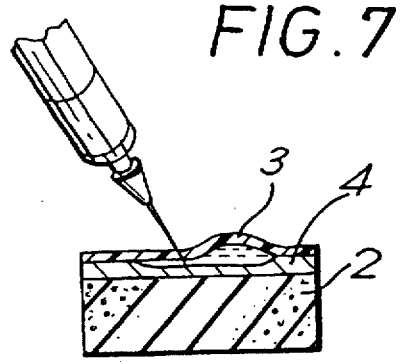
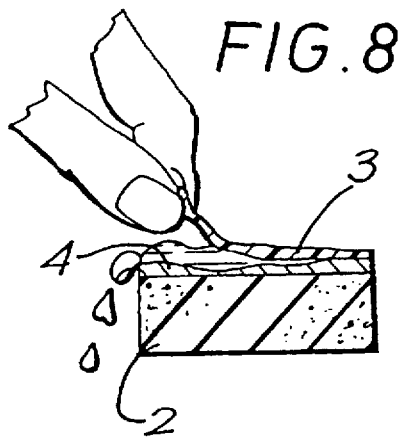
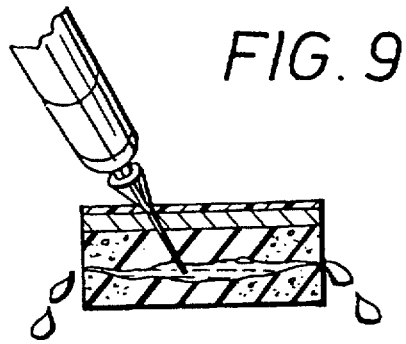
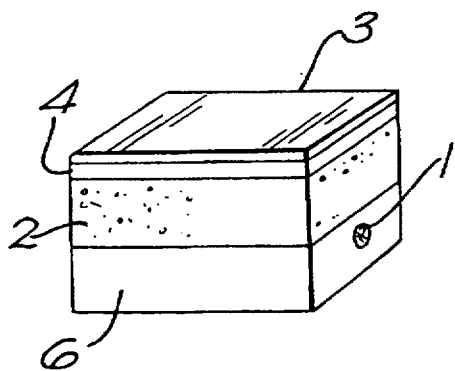
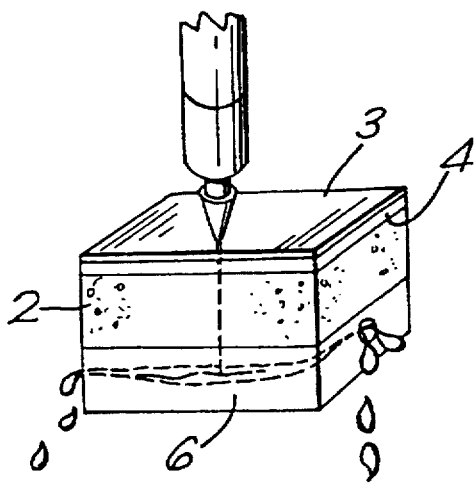

METHOD OF MAKING A SURGICAL AND/OR CLINICAL APPARATUS

This is a divisional application of Ser. No. 08/256,663, filed as PCT/GB93/00088 Jan. 15, 1993.

The present invention relates to surgical and/or clinical apparatus, in particular structures for simulating body tissue for use in practicing surgical and/or clinical techniques.

In the medical field, it is necessary for students, doctors and surgeons to be able to practice surgical and clinical techniques. More particularly, there is the need to practice the making of incisions, the removal of various kinds of complaint (such as cysts, haematomas and melanomas, for example), access to venous structures below the epidermis and the insertion of sutures. As an alternative to providing an actual body or part of an actual body for practicing such techniques, there is a need for artificial means whereby they can be practiced. Known structures providing simulations of body tissue suffer from the disadvantage that they are not sufficiently analogous, either visually or physically, to actual body tissue.

As prior art, there may be mentioned U.S. Pat. No. 4,481,001 which discloses a human skin model for training/demonstration purposes; GB-A-2 249 738 which discloses a foamed product impregnated and cured for use in a prosthesis; GB-A-2 243 324 which discloses a method of manufacturing a prosthesis from silicone rubber and a foamed material; GB-A-2 047 101 which disclose a self-sealing injection button for a body implant and having a unitary body of cured silicone; and EP-A-0 243 132 which discloses the production of artificial skin having a cultured epidermal cell layer.

According to a first aspect of the present invention, there is provided a simulation of body tissue for use in practicing surgical and/or clinical techniques, comprising a member of elastomeric material overlying which is a simulated epidermis in the form of a relatively thin sheet comprising foam latex rubber.

The sheet of foam latex rubber could include a reinforcement of mesh material, such as nylon, chiffon or lycra mesh material.

The elastomeric material could be latex foam, which could be impregnated with a mixture of a silicone sealant and a diluent.

Alternatively, the member of elastomeric material could comprise a mixture of silicone sealant and a diluent.

The sheet comprising foam latex rubber could be bonded to the member of elastomeric material, for example by a mixture of a silicone sealant and a diluent.

The member of elastomeric material could include a simulation of a vein structure.

According to a second aspect of the present invention, there is provided a kit for use in practicing surgical and/or clinical techniques, comprising:

a first member, having an attachment portion whereby it may be attached to a support;

a second member; and a third member having an opening in it, the second member being attachable to the third member for receiving a body tissue simulating portion between them with a surface of the body tissue simulating portion being revealed through said opening and the second and third members, when so attached together, being attachable to the first portion.

Such a kit may be provided together with such a body tissue simulating portion. There may be a plurality of such body tissue simulating portions which simulate different complaints.

The attachment portion of the first portion may comprise a clip portion.

The third member may comprise a first portion having the said opening and first and second flange portions depending from the first portion, the second member being attachable to the third member by being received by the flange portions. In this case, the first member may comprise a generally flat portion, the second and third members being attachable to said first member by the generally flat portion being received by the flange portions.

At least one of the second and third portions may be curved whereby such a body tissue simulating portion is held between them under tension.

The present invention will now be described, by way of example, with references to the accompanying drawings, in which:

FIG. 6 shows a composite body tissue simulating pad;

FIG. 7 illustrates the injection of fluid into the composite pad shown in FIG. 6;

FIG. 8 illustrates the release of injected fluid from the composite pad shown in FIG. 7;

FIG. 9 illustrates an alternative injection of fluid into the composite pad shown in FIG. 6;

FIG. 10 shows such a muscle layer incorporated in a composite pad;

FIG. 11 illustrates the injection of fluid into the composite pad shown in FIG. 10;

First, an example of a method of producing a simulation of human epidermis will be described.

The simulated epidermis is made by laying first a piece of reinforcement—be it nylon, chiffon or lycra for example—on to a sheet of toughened glass. The reinforcement is a mesh material which may, for example, be woven or knitted. Then a quantity (dependent of the required thickness) of liquid natural foam latex is poured on to the reinforcement and a second piece of glass placed over the whole. Pressure is applied evenly between the glass sheets by means of a clamp until the rubber has formed to a suitable thickness (approximately 0.5–2 mm). Then the rubber is allowed to gel and after gelation the top layer of glass is taken off and the lower, together with the reinforced foam, is placed in a low temperature oven and baked at 100° C. for one hour. After it has cooled, the sheet of reinforced foam is peeled off the glass, is then washed, dried and powdered and is ready for use.

To produce a shaped portion of simulated human epidermis, members of a mold may be substituted for the glass sheets. Reinforced liquid foam latex may be applied to the inside of one member of the mold and then squeezed to the correct thickness with the second member of the mold. The foam may then be processed as described above.

If desired, and for some uses, the above-mentioned reinforcement may be omitted from the epidermis, the latter consisting just of the natural foam latex processed as described above.

Various uses of such simulated epidermis are in apparatus for practicing surgical and/or clinical techniques (see below) and in many forms of medical trainers, model and mannequin applications.

Figure 1:
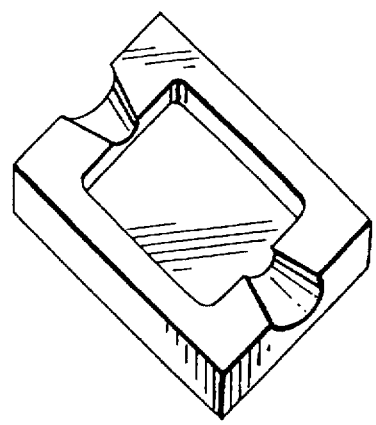
FIGS. 1 to 5 show stages in the manufacture of a simulated muscle layer.
Figure 2:
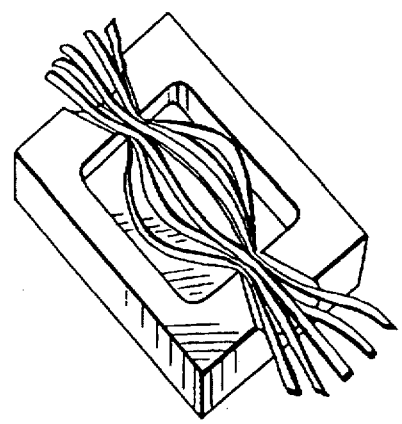
Figure 3:
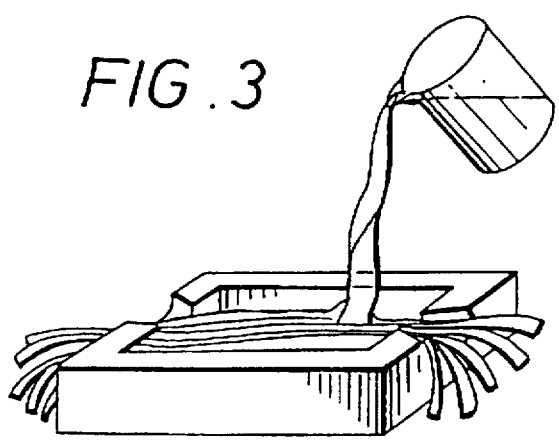
Figure 4:
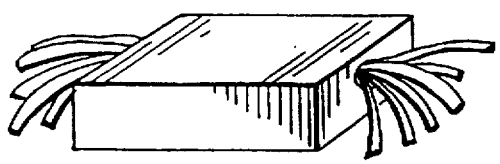
Figure 5:
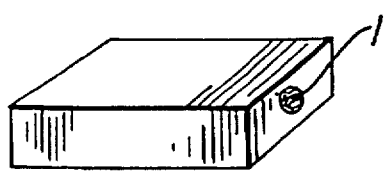

Such simulated epidermis may also be used in the construction of a simulated muscle portion. This may be molded in any suitable elastomeric material such as condensation cured silicone (including 10% silicone oil) and filled with pieces of simulated epidermis made as described above, cut up into strands and threaded into a muscle-like shape. More particularly, such strands may be laid into a plaster mold (as shown in FIG. 1) in the manner shown in FIG. 2, the elastomeric material being poured into the mold as shown in FIG. 3 and then allowed to set. The resulting shape from the mold is as shown in FIG. 4 which is then trimmed to have the shape shown in FIG. 5, where reference numeral 1 denotes the simulated muscle. Such a simulated muscle layer may be used in a pad for practicing intramuscular injections (see below).

A composite pad for practicing surgical and/or clinical techniques will now be described. FIG. 6 shows such a pad having a layer 2 simulating a subcutaneous layer, a layer 3 simulating epidermis and a bonding layer 4. The layer 2 comprises a dense latex foam; the bonding layer 4 comprises a mixture of silicone oil and silicone sealant; and the simulated epidermis 3 comprises a fine sheet of latex foam made as described above. A backing sheet 5 may be provided for support. The upper surface of the pad may suitably be about 12 cm by 8 cm.

One way to produce such a composite pad is as follows. A plain natural latex foam pad about 10 mm thick is soaked in a mixture of a silicone sealant and a diluent (suitably silicone oil), the pad is squeezed to remove any excess of this mixture and is hung to dry. The pad is then bonded, using the same or a similar mixture of silicone sealant and diluent, to a fine sheet of latex foam (which is a simulated epidermis as described above). Within the bond layer there may be laid, if desirable for the particular use of the composite pad, a reinforcement. This could be a mesh material of, for example, nylon, chiffon or lycra, which could be woven or knitted. The resultant pad may, if necessary, be mounted with nylon clips on to a 3 mm thick backing sheet of plastics support material such as a closed cell, cross-linked expanded polyethylene foam (for example "Plastazote" made by BXL Plastics Limited). If the composite pad is to be used for practicing suturing, it is preferable that the simulated epidermis be one in which such mesh reinforcement as described above is included.

The mixture of silicone sealant and diluent contains sufficient diluent to keep the soaked pad and the bond layer in a very soft state. The mixture preferably comprises 2 parts silicone oil (or other diluent) to 1 part silicone sealant. The silicone sealant may be one-part acetoxy-silicone sealant (for example Dow Corning 781 sealant) or oxime sealant (for example Dow Corning Q3-7099). The silicone oil may be either a non-reactive diluent, or a reactive diluent (as present in Cosmosil silicone).

In an alternative method, the natural foam latex pad is taken, then such a bonding layer is applied to it and then the simulated epidermis is applied, and thereafter the whole, composite pad is soaked in a diluent, e.g. a silicone oil.

A further composite structure (for example representing a human limb or part of such a limb) may be made which incorporates a portion of shaped simulated epidermis made as described above. The shaped simulated epidermis is laid up on to a shaped piece of foam rubber, to which it is glued with a mixture of sealant and diluent as described above. Alternatively, the shaped epidermis can be left in the mold in which it was formed, and when the second mold member has been removed the epidermis is then covered with a bonding layer and latex foam or is covered with an appropriate substitute such as an elastomeric poly-urethane or silicone gel and a replacement second mold member put in place to close the mold. The mold's contents are allowed to cure or are baked.

Methods of practicing surgical and/or clinical techniques using the composite pad, together with adaptations of the pad to suit those techniques, will now be described.

Suturing can be practiced in the upper layers of the composite pad.

Subcutaneous injections can be practiced by making injections into the space between the simulated epidermis 3 and the layer 4. The injected fluid will bulge up under the simulated epidermis (see FIG. 7) and may then be released by carefully peeling back the simulated epidermis (see FIG. 8) which can then reseal itself on to the layer 4.

Intradermal injections can be practiced by injecting into the layer 2, the injected fluid draining itself—see FIG. 9.

Underneath layers 2 and 3 and 4 a simulated muscle layer formed as described above can be clipped loosely to form a pad as shown in FIG. 10 in which reference numeral 6 denotes the muscle layer. The muscle layer can bond itself to the layer 2 by the inherent tackiness of the layer 2.

Intramuscular injections can then be practiced by injecting into the simulated muscle 1. Following this, the injected fluid drains out to some extent at the sides of the simulated muscle layer (see FIG. 11). The muscle layer can then be detached, squeezed out and reattached to the layer 2.

Figure 12:
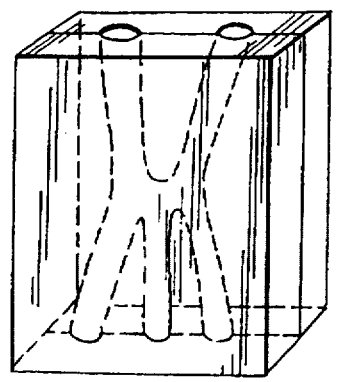
FIG. 12 shows a mold for the production of a simulated vein structure.

There will now be described a composite pad for practicing cannulation and cutdown techniques, having a removable simulated epidermis layer and a venous layer containing simulated veins formed of rubber and charged with fake blood. Such a pad comprises a venous layer having at least one tube of natural latex rubber or silicone (simulating veins) set into a pad of natural latex foam prior to the baking process or into a pad comprising such a mixture as described above of a silicone sealant and a diluent. The tube contains artificial blood which is under pressure similar to that in the body so that when the needle of a syringe is passed into the tube liquid will rise in the syringe. To form the simulated veins a thin latex solution is poured into a plaster mold in two halves (as shown in FIG. 12). The resulting simulated veins are then trimmed to size. Two vein patterns may be made: that shown in FIG. 13a, for straight veins, and that shown in FIG. 13b (as would be produced by the mold shown in FIG. 12) for antecubital fossae. An alternative is to make a former of the configuration of the vein structure and dip it into liquid latex rubber to produce the simulated veins. Initially, the simulated veins have open ends. Ends to be sealed (indicated by reference numeral 7 in FIGS. 13a and 13b) are capped with Dow Corning 781 sealant or rubber glue or any other suitable sealant, which is than allowed to set. The whole vein structure is then dipped in colored latex solution several times. Into the or one of the open vein ends, a cannula is glued and the simulated vein structure is thereby charged to the required pressure with fake blood (as used in the film industry for example)—see FIG. 14 in which reference numeral 8 denotes a cannula glued at 9 into the open end of a simulated vein 10.

Figure 13A:
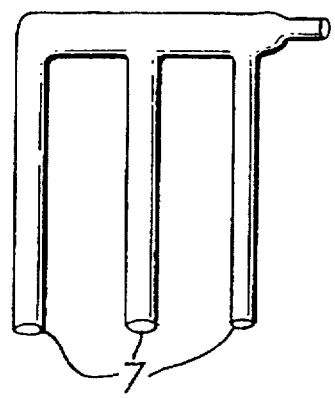
FIGS. 13a and 13b show simulated vein structures.
Figure 13B:
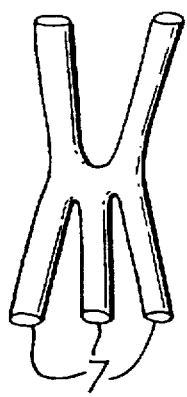
Figure 14:
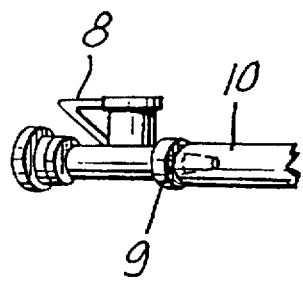
FIG. 14 shows a cannula attached to a portion of a simulated vein structure as shown in FIG. 13a or 13b.
Figure 15A:
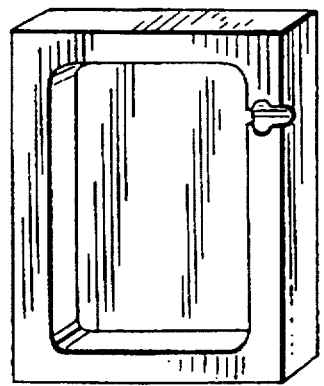
FIGS. 15a and 15b show molds for receiving the simulated vein structures shown in FIGS. 13a and 13b.
Figure 15B:
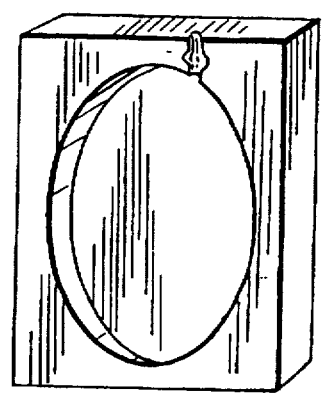
Figure 16:
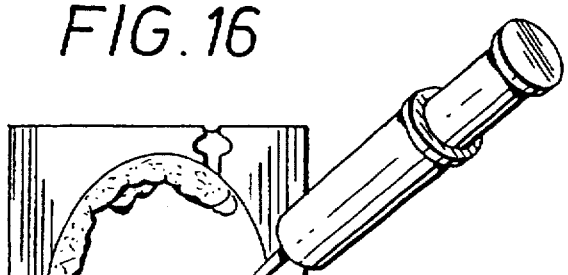
FIGS. 16 and 17 show stages in the manufacture of a simulated venous layer.
Figure 17:
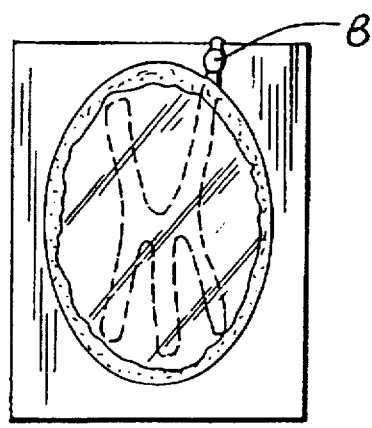

To form the venous layer, a plaster mold is provided for receiving the vein structure—see FIG. 15a for a vein pattern as shown in FIG. 13a and FIG. 15b for a vein pattern as shown in FIG. 13b. The inside of the mold having been sanded and shellaced, the mold is sprayed with silicone release agent. Then, silicone sealant (such as Dow Corning 781 sealant) is injected round the edge and on the base of the mold (see FIG. 16), neatened off and left to set for 30 minutes. As shown in FIG. 17, the vein structure is then laid in the mold and the mold filled with the mixture of silicone sealant and diluent described above, together with a suitable coloring agent (see FIG. 17). The mixture is allowed to set for 24 hours. The "upper" face of the resultant pad rests on the bottom of the mold so it is smooth. The vein structure lies at the top of the mold, producing a pad which simulates deeply-set veins. A second version can be laid up so that the veins are more superficial in the pad. The vein structure is removable and can be replaced when extensively punctured.

Figure 18A:
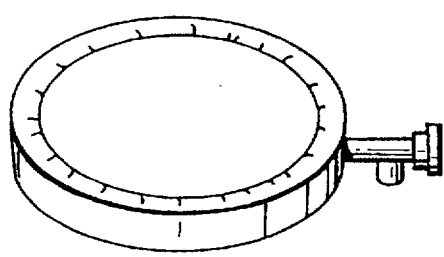
FIGS. 18a and 18b show a composite pad covered with a simulated epidermis.
Figure 18B:
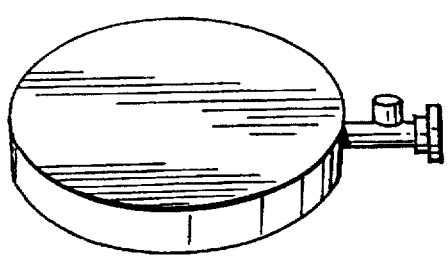

A base for the cannulation pad is cut from a 2 mm sheet of styrene and glued on to the bottom of the venous layer. A cover for the pad is cut from simulated epidermis (made according to any example as described above), the cover being edged with bias binding and threaded with elastic so that it can be placed over the pad as a removable cover —see FIGS. 18a and 18b which show the bottom and the top respectively of a cannulation pad covered with an epidermis cover.

Figure 19:
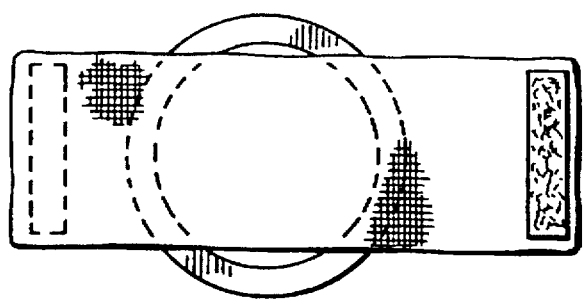
FIG. 19 shows such a composite pad attached to an arm band.

An elastic arm band may then be glued on to the styrene, which armband has at one end hooks and at the other end loops (on the opposite side) to provide a "touch and close" (or "hook and loop") fastener (see FIG. 19) whereby the armband may be fastened to an arm of a user.

In an alternative structure, the vein structure terminates in a bubble-like structure instead of a cannula, whereby pressure in the vein structure can be increased via a simple hand pump operating on the bubble-like structure.

Pads simulating a variety of conditions which are presented for minor surgery to doctors ' clinics or hospital departments, for example, to allow techniques for the treatment or diagnosis of those conditions to be practiced will now be described.

A Pad in Which There is a Simulated Sebaceous Cyst

To produce such a pad, a silicone rubber bubble is provided filled with a malleable waxy material such as margarine. It is made by shaping the waxy material into a ball and suspending it on a pin. The ball, being suspended by the pin, is dipped into a catalysed silicone composition which is then allowed to cure with the waxy inclusion inside it, forming the bubble. Then the bubble is set into a natural latex foam pad which has been soaked in the mixture of silicone sealant and diluent described above, and bonded to a fine sheet of simulated epidermis as in the composite pad described above.

A Pad in Which a Perianal Haematoma is Simulated

To produce such a pad, part of a condom is filled with artificial blood (as is used in the film industry for example) and is set into a pad of natural latex foam as part of a composite pad.

A Pad in Which a Lipoma is Simulated

To produce such a pad, condensation cured silicone rubber and silicone oil are dribbled into a bowl of water, thereby making globules which resemble fat. These are mixed with the mixture of a silicone sealant and diluent described above, together with coloring, and shaped to form small balls. Each of these, as a simulated lipoma, is let into the "fat" layer of a composite suture pad. Alternatively, to produce such a lipoma-simulating pad a ball of silicone rubber, gelatine or vinyl PVC may be set in a natural latex foam pad.

A Pad in Which a Dirty Wound is Simulated

To produce such a pad, a simple foam pad or a foam pad similar to the composite pad described above is torn and made to look like a wound using a selection of substances or is molded and cosmetically colored so as to look convincing.

A Pad in Which a Melanoma is Simulated

To produce such a pad, a natural latex foam pad is made in a mold which leaves a hole in the surface of the pad, into which is placed a light brown piece of silicone rubber, gelatine or vinyl PVC which fills the hole and is either slightly raised or flat.

A Pad in Which a Lesion for Curettage is Simulated

Shapes representing different types of skin conditions suitable for curettage are made of an organic material and each is either let into a pad of gelating by locally melting the gelating around the "lesion", or glued with a self-levelling silicone sealant into a structure like the base of the cannulation pad described above.

A Pad in Which a Wart for Cryotherapy is Simulated

A simulated wart comprising a mixture of an organic alginate and gelatine is let into a gelatine pad so that when liquid nitrogen is applied the lesion and surrounding area turn white.

A Pad in Which a Skin Tag is Simulated

Similar material as in the preceding paragraph is turned into a "tag" shape and is reinforced within with thread and let into a pad composed of gelatine with a cross-linking agent.

Pads in which a ganglion or a seborrhoeic wart are simulated may also be produced.

Figure 20:
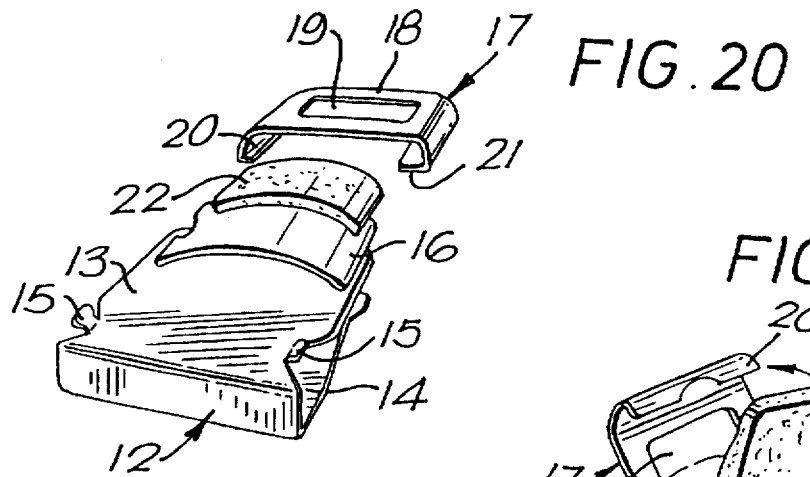
FIG. 20 is a perspective view showing the components of a kit.

A kit for providing a means of practicing surgical techniques will now be described. Referring to FIG. 20, a first member 12 of the kit comprises a generally flat portion 13 and, underlying that, a flexible clip portion 14. Reference numeral 15 designates lugs, one on each side of the member 12. A second member 16 is in the form of a curved sheet. A third member 17 comprises a first, generally flat portion 18 having an opening 19 and first and second flange portions 20 and 21 depending from the first portion 18. Reference numeral 22 denotes a pad of latex foam providing a skin and underlying flesh simulating portion. This may suitably be a composite pad as described above.

Members 12, 16 and 17 are each made from "Foamex", which is a uniform closed cell structure, lightly expanded rigid thermoplastic (in particular polyvinylchloride (PVC)) material in sheet form, as manufactured by AIREX A.G. of CH 5643, Sins, Switzerland. Each of members 12, 16 and 17 is made by die cutting a sheet of "Foamex", heating it and forming it around an appropriate plaster mold. Then the material sets and can be removed from the mold.

The components of the kit, to provide an assembly for use in practicing surgical techniques, are assembled as follows.

Figure 21:
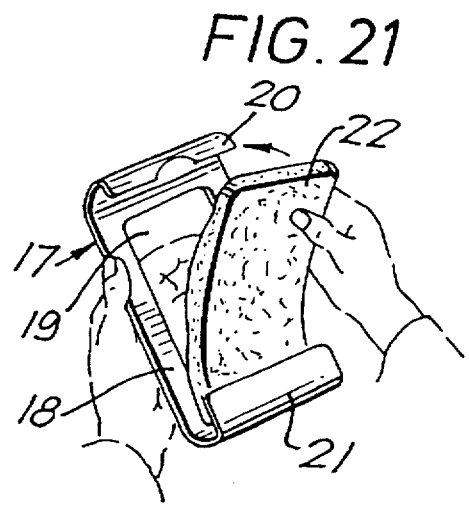
FIG. 21 shows how a body tissue simulating portion is received by a third member of the kit.
Figure 22:
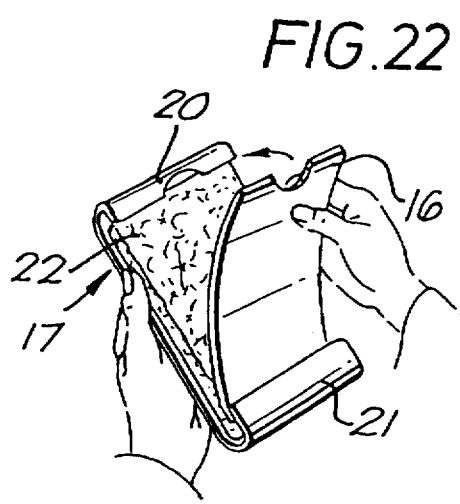
FIGS. 22 and 23 show how a second member of the kit is attached to the third member.
Figure 23:
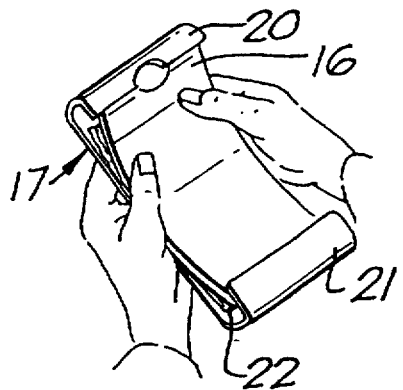

Referring to FIG. 21, one end of the pad 22 of latex foam is inserted by hand under the flange portion 21 and the other end is then inserted by hand under the flange portion 20. Thereafter, one end of the member 16 is inserted by hand under the flange portion 21 and the other end is inserted by hand under the flange portion 20 so that the member 16 is attached to the member 17 with the pad 11 received between them—see FIGS. 22 and 23. By virtue of the curvature of member 16, the pad 22 is held under tension to more realistically simulate skin with underlying flesh.

Figure 24:
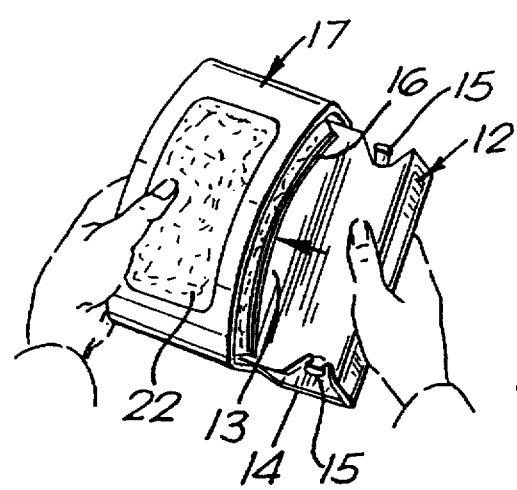
FIG. 24 shows how the third and second members are attached to a first member of a kit.

Then, the generally flat portion 13 of the member 12 is slid by hand between the member 16 and the flange portions 20 and 21 so that the members 16 and 17 with the pad 22 between them are attached to the member 12 by the generally flat portion 13 of member 12 being received by the flange portions 20 and 21—see FIG. 24.

Figure 25:
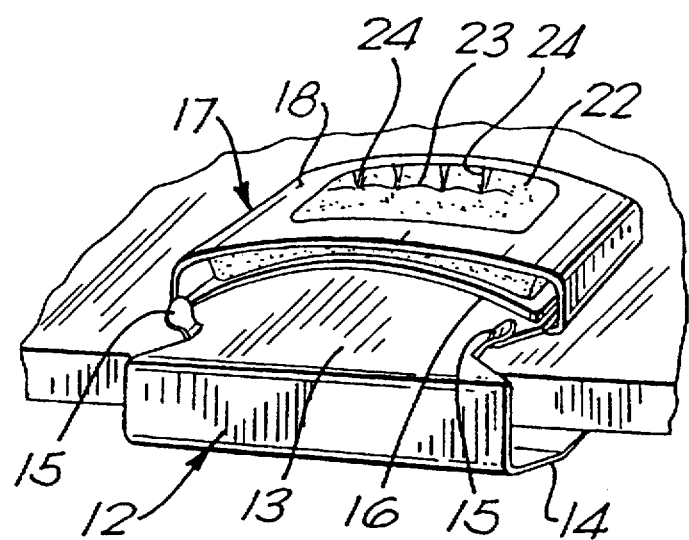
FIG. 25 shows a complete assembly of the components of the kit attached to a table.

The thus assembled components of the kit now provide an assembly for use in practicing surgical techniques. The assembly may be attached to, for example, the edge of a table or workbench via the flexible clip portion 14—see FIG. 25. A surface of the pad 22 is revealed through the opening 19 in the member 18 whereby surgical techniques may be practiced. In particular, suturing may be practiced. In FIG. 25, reference numeral 23 denotes an incision which has been made in the pad 22, reference numeral 24 denoting sutures which have been inserted after the incision 23 was made.

An artificial blood vessel may be looped between the lugs 15 to allow the tying of a blood vessel or anastomosis may be practiced.

The components of the kit described above may be provided in a strong box made of polypropylene, together with a series of latex foam pads 22 of the types described above. There may be packed in individual sealed bags.

We claim:

1. A method of making a simulation of body tissue for use in practicing surgical and/or clinical techniques, the method comprising:
   a) forming a simulated epidermal layer comprising the steps:
      i) locating a liquid-foam-latex-coated mesh material between first and second mold members which are spaced closely together to provide a thin layer;
      ii) allowing the liquid-foam-latex to gel;
      iii) heating the latex-coated mesh material until the foam latex is cured; and
      iv) allowing the resultant material to cool to form a thin, rubber coated mesh; and
   applying the thin, rubber-coated mesh material over a member of elastomeric material.

2. A method as claimed in claim 1, wherein the mesh material comprises woven or knitted material.

3. A method as claimed in claim 2 wherein said woven or knitted material is selected from the group consisting of nylon, chiffon and lycra.

4. A method as claimed in claim 1, wherein said thin, rubber-coated mesh material is bonded to the member of elastomeric material.

5. A method as claimed in claim 1, wherein the elastomeric material is latex foam.

6. A method as claimed in claim 5, wherein the latex foam comprising the member of elastomeric material is impregnated with a mixture of a silicone sealant and a diluent.

7. A method as claimed in claim 5, wherein said thin, rubber-coated mesh material is bonded to the member of elastomeric material by a mixture of a silicone sealant and a diluent.

8. A method as claimed in claim 7, wherein the latex foam comprising the member of elastomeric material is impregnated with a mixture of a silicone sealant and a diluent.

9. A method as claimed in claim 5, wherein said thin, rubber-coated mesh material is bonded to the member of elastomeric material and wherein the latex foam comprising the member of elastomeric material is impregnated with a mixture of a silicone sealant and a diluent.

10. A method as claimed in claim 9, wherein said silicone sealant is selected from the group consisting of one-part acetoxy-silicone sealants and oxime sealants.

11. A method as claimed in claim 9 wherein said diluent comprises silicone oil.

12. The method of claim 11 wherein the ratio of silicone oil diluent to silicone sealant is approximately 2:1.

13. A method as claimed in claim 1, wherein the member of elastomeric material comprises a mixture of a silicone sealant and a diluent.

14. A method as claimed in claim 1, wherein the member of elastomeric material includes a simulation of a vein structure.

15. The method of claim 1 wherein said first and second mold members are spaced to make the rubber-coated mesh material a thickness between 0.5 and 2 mm.

* * * * *